(12) United States Patent
Steinbrecher et al.

(10) Patent No.: US 11,572,724 B2
(45) Date of Patent: Feb. 7, 2023

(54) COLLISION ENERGY ABSORBING APPARATUS, SYSTEMS, AND METHODS

(71) Applicant: TOYOTA MOTOR ENGINEERING & MANUFACTURING NORTH AMERICA, INC., Plano, TX (US)

(72) Inventors: Robert Charles Steinbrecher, Dexter, MI (US); Kimberly A. Strigle, Ann Arbor, MI (US); Eric M. Botten, Grosse Ile, MI (US); Peter J. Finnie, Ann Arbor, MI (US); Prashant K. Deore, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 279 days.

(21) Appl. No.: 16/675,760

(22) Filed: Nov. 6, 2019

(65) Prior Publication Data
US 2021/0129789 A1 May 6, 2021

(51) Int. Cl.
*E05D 5/06* (2006.01)
*B62D 25/12* (2006.01)
*B60R 21/34* (2011.01)
*E05D 11/06* (2006.01)
*E05D 11/00* (2006.01)

(52) U.S. Cl.
CPC .............. *E05D 5/062* (2013.01); *B60R 21/34* (2013.01); *B62D 25/12* (2013.01); *E05D 11/00* (2013.01); *E05D 11/06* (2013.01); *B60R 2021/343* (2013.01); *E05Y 2900/536* (2013.01); *Y10T 16/521* (2015.01)

(58) Field of Classification Search
CPC ....... Y10T 16/521; E05D 5/062; E05D 11/00; E05D 11/06
See application file for complete search history.

(56) References Cited

U.S. PATENT DOCUMENTS 5,718,019 A * 2/1998 Cheal .................... E05D 11/00
16/222
6,543,086 B2 * 4/2003 Bjureblad ............... B60R 21/34
16/222

(Continued)

FOREIGN PATENT DOCUMENTS

CN 109025580 A 12/2018
DE 10126454 A * 12/2002

(Continued)

*Primary Examiner* — Jeffrey O'Brien
(74) *Attorney, Agent, or Firm* — Haynes and Boone, LLP (57) ABSTRACT

Apparatuses, systems, and methods for absorbing energy in a hinge are provided. An apparatus may include a first portion, a second portion coupled to the first portion to move relative to the first portion, and a tab configured relative to the first and second portions to absorb energy imparted to the second portion during a collision. The tab may be bendable via rotation as the second portion moves towards the first portion during the collision. The first portion may be a hinge bracket securable to a vehicle body. The second portion may be a hinge arm securable to a vehicle hood. The tab may be positioned at least partially between the first portion and the second portion for selective interference of the tab with one of the first portion and the second portion.

20 Claims, 4 Drawing Sheets

(56) References Cited

U.S. PATENT DOCUMENTS

| | | | | |
|---|---|---|---|---|
| 6,755,268 B1* | 6/2004 | Polz | B60R 21/34 | 180/69.21 |
| 6,834,735 B2* | 12/2004 | Kim | E05D 3/145 | 180/69.21 |
| 6,934,999 B2* | 8/2005 | Kreth | B60R 21/34 | 16/222 |
| 7,017,232 B1* | 3/2006 | Priddy | E05F 1/1276 | 16/286 |
| 7,231,995 B1* | 6/2007 | Polz | B60R 21/34 | 16/222 |
| 7,296,325 B1* | 11/2007 | Putumbaka | E05D 3/02 | 16/348 |
| 7,596,833 B2* | 10/2009 | Erwin | B60R 21/38 | 16/370 |
| 7,681,685 B2* | 3/2010 | Herzog | B60R 21/38 | 180/274 |
| 7,845,053 B2* | 12/2010 | Marsh | E05D 11/06 | 16/357 |
| 7,934,293 B2* | 5/2011 | Kalargeros | B60R 21/38 | 16/369 |
| 8,307,935 B2* | 11/2012 | Takahashi | B62D 25/12 | 180/274 |
| 8,336,666 B2* | 12/2012 | Thomas | B60R 21/34 | 180/274 |
| 8,726,466 B2* | 5/2014 | Kim | E05D 5/062 | 16/387 |
| 9,481,340 B2 | 11/2016 | Kim et al. | | |
| 9,701,275 B2* | 7/2017 | Kim | B60R 21/34 | |
| 9,783,154 B2* | 10/2017 | Kim | E05D 5/0207 | |
| 9,914,427 B1* | 3/2018 | Kim | B60R 21/38 | |
| 10,315,613 B2* | 6/2019 | Patterson | E05D 3/06 | |
| 10,697,217 B2* | 6/2020 | Sawada | E05D 3/02 | |
| 2005/0279550 A1* | 12/2005 | Saville | B60R 21/38 | 180/69.21 |

FOREIGN PATENT DOCUMENTS

| | | |
|---|---|---|
| KR | 101461314 B1 | 11/2014 |
| WO | 2018162284 A1 | 9/2018 |

* cited by examiner

US 11,572,724 B2

COLLISION ENERGY ABSORBING APPARATUS, SYSTEMS, AND METHODS

TECHNICAL FIELD

The present disclosure relates generally to vehicle safety features, and, more particularly, to apparatuses, systems, and methods for absorbing collision energy.

BACKGROUND

Vehicle hoods and their hood hinges are currently designed to provide clearance for the hood hinges during pedestrian impact, for example, by allowing the hood hinges to move freely upon impact. However, some traditional hood hinges do not provide energy absorption during impact, which can reduce deformation stroke.

BRIEF SUMMARY

The present disclosure provides an apparatus (e.g., a hood hinge for a vehicle) that includes a tunable, energy absorbing structure, such as a tab or stop. Upon impact (e.g., pedestrian impact), the apparatus bends the tunable, energy absorbing tab, providing energy absorption during the impact while maintaining desired deformation stroke. The apparatus may reduce deformation stroke available to absorb energy before the hood hinge bottoms out on a body of the vehicle.

Various embodiments of the present disclosure include an apparatus for absorbing energy. The apparatus may include a first portion, a second portion coupled to the first portion to move relative to the first portion, and a tab configured relative to the first and second portions to absorb energy imparted to the second portion during a collision. The tab may be bendable via rotation as the second portion moves towards the first portion during the collision.

Various embodiments of the present disclosure include a vehicle hinge. The vehicle hinge may include a hinge bracket securable to a first portion of a vehicle, a hinge arm securable to a second portion of the vehicle, and a tab configured relative to the hinge bracket and the hinge arm. The hinge arm may be coupled to the hinge bracket to allow movement of the second portion of the vehicle relative to the first portion. The tab may bend to absorb impact energy during collision of an object with the second portion of the vehicle.

Various embodiments of the present disclosure include a method for absorbing energy in a hinge. The method may include providing a hinge bracket and a hinge arm, and positioning an energy absorbing structure at least partially between the hinge bracket and the hinge arm for selective interference of the energy absorbing structure with one of the hinge bracket and the hinge arm. The energy absorbing structure may include a tab configured to rotatably bend as the hinge arm moves towards the hinge bracket during a collision.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

DETAILED DESCRIPTION

The present disclosure provides an apparatus, such as a vehicle hinge, that includes a tunable, energy absorbing structure, such as a tab. During a collision, the apparatus bends the tunable, energy absorbing tab, providing energy absorption during impact while maintaining a desired deformation stroke before the hood hinge bottoms out on a body of the vehicle.

The apparatus may include a first portion, a second portion coupled to the first portion to move relative to the first portion, and a tab configured relative to the first and second portions to absorb energy imparted to the second portion during a collision. The tab may be bendable via rotation as the second portion moves towards the first portion during the collision. The first portion may be a hinge bracket securable to a vehicle body. The second portion may be a hinge arm securable to a vehicle hood. The tab may be positioned at least partially between the first portion and the second portion for selective interference of the tab with one of the first portion and the second portion.

Figure 1:
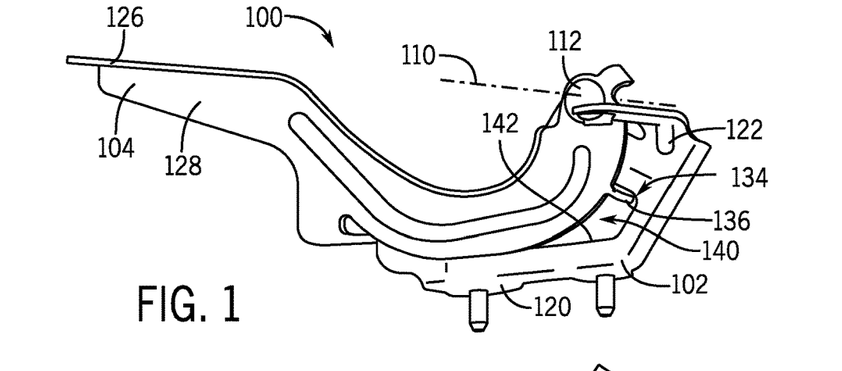
FIG. 1 is a perspective view of an apparatus for absorbing impact energy, according to one or more embodiments of the present disclosure.

FIG. 1 is a perspective view of an apparatus 100, according to one or more embodiments of the present disclosure. The apparatus 100 may include many configurations allowing the apparatus 100 to absorb impact energy. For instance, the apparatus 100 may be designed or otherwise configured to absorb energy imparted to the apparatus 100 during a collision or other impact. Depending on the application, the apparatus 100 may absorb impact energy by restricting movement of at least a portion of the apparatus 100, as explained in detail below. For example, the apparatus 100 may include one or more elements, structures, or assemblies that absorb energy by restricting continued movement of the apparatus 100 beyond a closed or near-closed position, as detailed below.

As shown in FIG. 1, the apparatus 100 includes a first portion 102 and a second portion 104. The second portion 104 may be coupled to the first portion 102 to move relative to the first portion 102. For instance, the second portion 104 may be rotatably or pivotably coupled to the first portion 102 in a manner allowing movement of the second portion 104 relative to the first portion 102. In various embodiments, the second portion 104 may be rotatably coupled to the first portion 102 at a rotational axis 110. For instance, the second portion 104 may be coupled to a boss 112 extending from the first portion 102 for rotation about the rotational axis 110. Alternatively, the boss 112 may extend from the second portion 104 for rotatable receipt within the first portion 102, the boss 112 rotating within the first portion 102 about the rotational axis 110. In some embodiments, the boss 112 may be a separate element to which the first portion 102 and the second portion 104 are coupled for movement relative to each other. The first portion 102 and/or the second portion 104 may be coupled to the boss 112 directly or via one or more additional elements, such as via one or more bearings or the like. Such examples are illustrative only, and the first and second portions 102, 104 may be coupled together in other configurations allowing movement of the second portion 104 relative to the first portion 102.

The first portion 102 may include many configurations. For instance, the first portion 102 may include, define, or be referred to as a hinge bracket. The first portion 102 may be securable to a fixed element or structure, whether absolute or relative. As described herein, the fixed element may be any object or structure that is generally secured against movement or defines a reference orientation and/or position. For instance, the fixed element may be a wall, floor, base, or frame, whether fixed in place or otherwise. In various embodiments, the fixed element may be a first portion 102 of a vehicle, such as a vehicle body or frame, as explained below. As shown, the first portion 102 may include a first flange 120 and a first body 122 extending from the first flange 120. The first flange 120 may secure the first portion 102 of the apparatus 100 to the fixed element, such as via mechanical fasteners, welding, adhesive, corresponding retention features, or the like.

The second portion 104 may include many configurations. For example, the second portion 104 may include, define, or be referred to as a hinge arm. The second portion 104 may be securable to a movable element to move the movable element relative to the fixed element. As described herein, the movable element may be any object or structure that is designed for movement between positions relative to the fixed element. For example, the movable element may be a covering, lid, etc. associated with the fixed element. In various embodiments, the movable element may be a second portion 104 of a vehicle, such as a vehicle hood, as explained below. In such embodiments, the second portion 104 of the apparatus 100 may rotate about the rotational axis 110 relative to the first portion 102 to move the second portion 104 of the vehicle relative to the first portion 102, such as between open and closed positions, as detailed more fully below. As shown, the second portion 104 may include a second flange 126 and a second body 128 extending from the second flange 126. The second flange 126 may secure the second portion 104 of the apparatus 100 to the movable element, such as via mechanical fasteners, welding, adhesive, corresponding retention features, or the like. Depending on the application, the second body 128 of the second portion 104 may be rotatably coupled to the first body 122 of the first portion 102.

With continued reference to FIG. 1, the apparatus 100 includes an energy absorbing structure 134. The energy absorbing structure 134 may be positioned at least partially between the first portion 102 and the second portion 104 for selective interference of the energy absorbing structure 134 with one of the first portion 102 and the second portion 104. For example, the energy absorbing structure 134 may include or define a tab 136. In such embodiments, the tab 136 may be configured relative to the first and second portions 102, 104 of the apparatus 100 to absorb energy imparted to the second portion 104 during a collision or other impact. For example, the tab 136 may be bendable via rotation as the second portion 104 moves towards the first portion 102 during a collision or other impact. In such embodiments, at least a portion of the energy or force imparted to the second portion 104 during a collision or other impact may be diverted to bending the tab 136. Though a tab 136 is shown and described, the energy absorbing structure 134 may include other suitable configurations.

The tab 136 may include many configurations. For example, the tab 136 may extend from one of the first portion 102 and second portion 104 of the apparatus 100 for selective interference with the other of the first portion 102 and the second portion 104. In some embodiments, the tab 136 may extend from the second portion 104 of the apparatus 100 for selective interference with the first portion 102, such as from the second body 128 of the second portion 104 for selective interference with the first body 122 of the first portion 102. In some embodiments, the tab 136 may be cantilevered from the second portion 104 for selective interference with the first portion 102. More specifically, a cutout or aperture 140 may be defined in the first portion 102, such as within the first body 122. The aperture 140 may be defined by an engagement wall or surface 142. In such embodiments, the tab 136 may extend from the second portion 104 to within the aperture 140 for selective interference with the engagement surface 142. The tab 136 may be secured to or formed integrally with one of the first portion 102 and the second portion 104 for selective contact with the other of the first portion 102 and the second portion 104. For example, the tab 136 may be secured to or formed integrally with the second portion 104 for contact with the first portion 102, though other configurations are contemplated.

The tab 136 and/or the aperture 140 may be sized and/or shaped to permit movement of the second portion 104 relative to the first portion 102. For example, the aperture 140 may include a shape and/or size permitting movement of the tab 136 therein as the apparatus 100 moves between a closed position and an open position. Specifically, the aperture 140 may define a space or opening of sufficient size to allow the apparatus 100 to move between the closed and open positions as the tab 136 moves within the space. In the open position, the second portion 104 of the apparatus 100 may be positioned relative to the first portion 102 such that the tab 136 is positioned away from the engagement surface 142. In the closed position, the second portion 104 of the apparatus 100 may be positioned relative to the first portion 102 such that the tab 136 is positioned adjacent to or in at least partial contact with the engagement surface 142. To move the apparatus 100 to the open position, the second portion 104 may be rotated about the rotational axis 110 in a first direction (e.g., clockwise in FIG. 2) to move the second portion 104 away from the first portion 102. To move the apparatus 100 to the closed position, the second portion 104 may be rotated about the rotational axis 110 in a second direction (e.g., counterclockwise in FIG. 2) to move the second portion 104 towards the first portion 102. As explained in detail below, further rotation of the second portion 104 about the rotational axis 110 beyond the closed position of the apparatus 100 may bend the tab 136 as the tab 136 interferes with the first portion 102 of the apparatus 100.

In some embodiments, the tab 136 and/or the aperture 140 may be sized and/or shaped to define one or more positions of the apparatus 100, such as the closed position and/or the open position. For example, selective interference of the tab 136 with the first portion 102 of the apparatus 100 (e.g., with the engagement surface 142) may define the closed position, or nominal position, of the apparatus 100. In such embodiments, the tab 136 may define a stop that defines the closed position of the apparatus 100. A collision or impact may cause the second portion 104 to rotate about the rotational axis 110 beyond the closed position of the apparatus 100, thereby bending the tab 136. In the open position, the second portion 104 may be rotated about the rotational axis 110 and relative to the first portion 102 to move the tab 136 away from the engagement surface 142.

Figure 2:
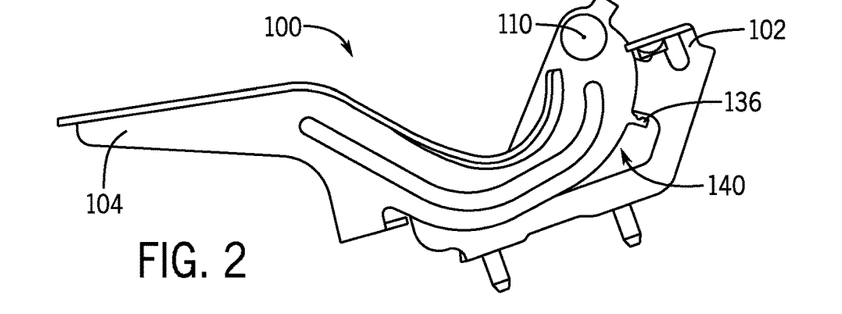
FIG. 2 is a side view of the apparatus of FIG. 1 in a first, pre-impact position, according to one or more embodiments of the present disclosure.
Figure 3:
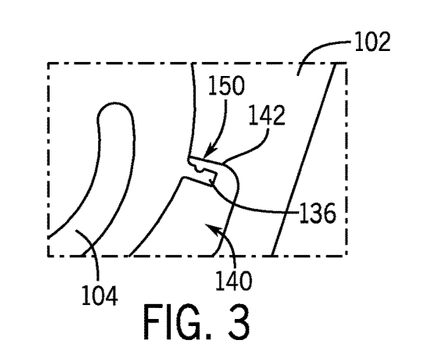
FIG. 3 is an enlarged, fragmentary view of the apparatus of FIG. 2, according to one or more embodiments of the present disclosure.
Figure 4:
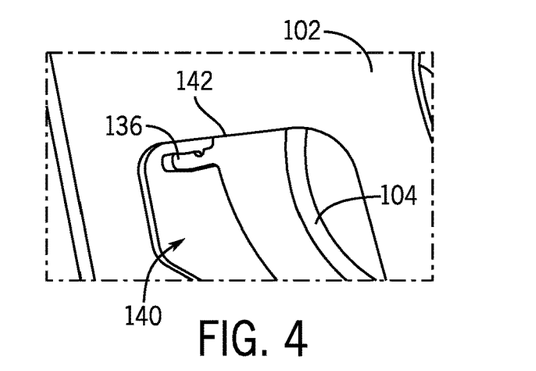
FIG. 4 is an enlarged, fragmentary view of the apparatus similar to FIG. 3 but taken on an opposing side of the apparatus, according to one or more embodiments of the present disclosure.
Figure 5:
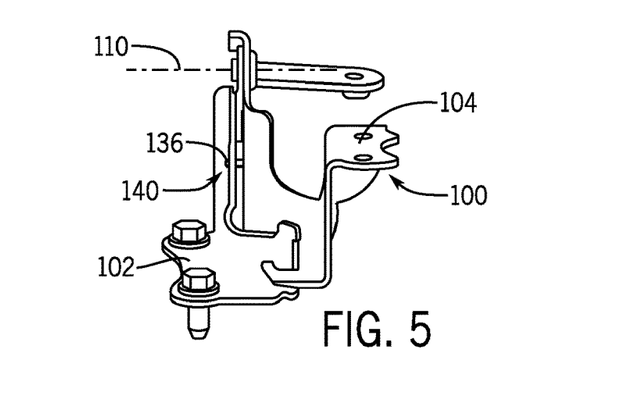
FIG. 5 is a front view of the apparatus of FIG. 1 in the first, pre-impact position, according to one or more embodiments of the present disclosure.

FIG. 2 is a side view of the apparatus 100 in a first, pre-impact position, according to one or more embodiments of the present disclosure. FIG. 3 is an enlarged, fragmentary view of the apparatus 100 taken along Detail 3-3 of FIG. 2, according to one or more embodiments of the present disclosure. FIG. 4 is an enlarged, fragmentary view of the apparatus 100 similar to FIG. 3 but taken on an opposing side of the apparatus 100, according to one or more embodiments of the present disclosure. FIG. 5 is a front view of the apparatus 100 in the first, pre-impact position, according to one or more embodiments of the present disclosure. Referring to FIGS. 2-5, the first position may be a pre-impact position of the apparatus 100 prior to a collision or impact. For instance, the first position of the apparatus 100 may be the closed or nominal position of the apparatus 100. As shown, the first, pre-impact position may be defined by the tab 136 engaging or nearly engaging the engagement surface 142. As best shown in FIGS. 3 and 4, the tab 136 may extend within the space between the first and second portions 102, 104 of the apparatus 100, such as within the aperture 140 defined within the first portion 102.

Figure 6:
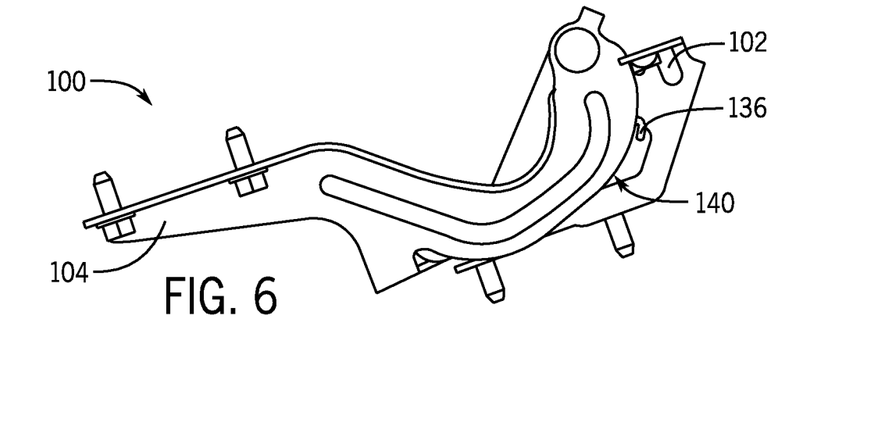
FIG. 6 is a side view of the apparatus of FIG. 1 in a second, post-impact position, according to one or more embodiments of the present disclosure.
Figure 7:
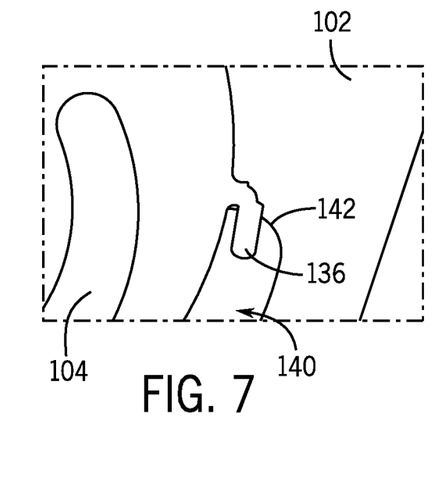
FIG. 7 is an enlarged, fragmentary view of the apparatus of FIG. 6, according to one or more embodiments of the present disclosure.
Figure 8:
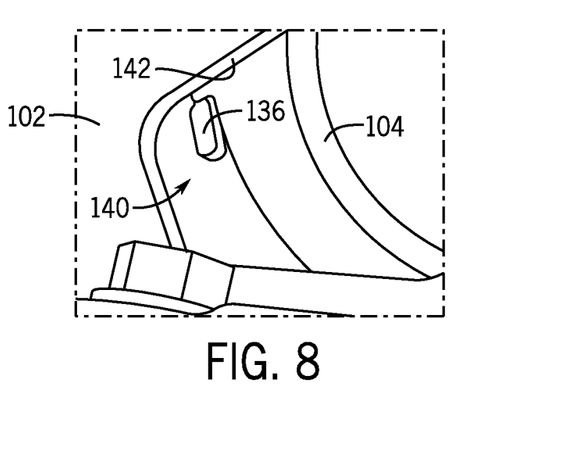
FIG. 8 is an enlarged, fragmentary view of the apparatus similar to FIG. 7 but taken on an opposing side of the apparatus, according to one or more embodiments of the present disclosure.
Figure 9:
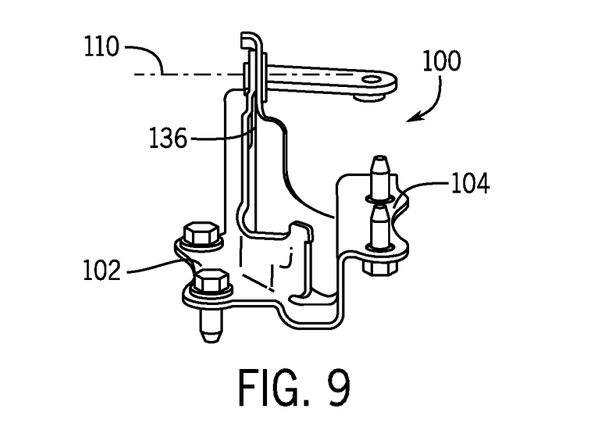
FIG. 9 is a front view of the apparatus of FIG. 1 in the second, post-impact position, according to one or more embodiments of the present disclosure.

FIG. 6 is a side view of the apparatus 100 in a second, post-impact position, according to one or more embodiments of the present disclosure. FIG. 7 is an enlarged, fragmentary view of the apparatus 100 taken along Detail 7-7 of FIG. 6, according to one or more embodiments of the present disclosure. FIG. 8 is an enlarged, fragmentary view of the apparatus 100 similar to FIG. 7 but taken on an opposing side of the apparatus 100, according to one or more embodiments of the present disclosure. FIG. 9 is a front view of the apparatus 100 in the second, post-impact position, according to one or more embodiments of the present disclosure. Referring to FIGS. 6-9, the second position may be a post-impact position of the apparatus 100 after a collision or impact. For instance, collision or impact of the movable element connected to the second portion 104 of the apparatus 100, such as collision or impact of a vehicle hood with a pedestrian, may cause the second portion 104 of the apparatus 100 to rotate towards the first portion 102 beyond the closed position of the apparatus 100. As the second portion 104 rotates towards the first portion 102 beyond the closed position, the tab 136 may contact the engagement surface 142 and begin to bend as the tab 136 interferes with the engagement surface 142.

The bending of the tab 136 caused by interference between the first portion 102 and the second portion 104 of the apparatus 100 may absorb at least a portion of the energy or force imparted to the apparatus 100 during the collision or impact. Specifically, at least a portion of the energy or force imparted to the apparatus 100 during the collision or impact may be directed to bending the tab 136 rather than to the colliding object or person. In this manner, the bending of the tab 136 may soften or dampen the collision energy or force to lessen the energy or force directed to the colliding object or person during the collision or impact. In some embodiments, the tab 136 may bend only after a threshold impact force is imparted to the apparatus 100. For instance, the tab 136 may include sufficient strength to limit bending of the tab 136 under non-collision conditions, such as in low-speed, non-damaging, and/or non-injury producing contact with a person or object, holding the vehicle hood in the closed position, etc.

Depending on the severity of the collision or impact, the tab 136 may bend slightly, partially, or completely to allow continued movement of the second portion 104 of the apparatus 100 relative to the first portion 102 beyond the closed position of the apparatus 100. For instance, the tab 136 may bend slightly or partially for small collisions and may bend completely or more fully for more severe collisions. In this manner, the tab 136 may be tunable to allow movement or stroke of the apparatus 100 beyond the closed position without bottoming out the apparatus 100, such as against a vehicle body. For instance, the tab 136 may be sized and/or shaped such that a small force bends the tab 136. In some embodiments, the tab 136 may be sized and/or shaped such that the tab 136 does not bend unless a large force is imparted to the tab 136. In some embodiments, the tab 136 may be sized and/or shaped such that the energy absorption is progressive, the tab 136 bending initially to absorb a small impact force, with continued bending of the tab 136 requiring progressively larger impact forces. Such configurations may spread the total collision or impact energy/force over time, thereby reducing peak forces imparted to the colliding object or person, which may reduce head injury criterion (HIC) scores in vehicle hood-pedestrian applications, for instance. In some embodiments, and as best shown in FIG. 3, the tab 136 may include a notch 150, such as adjacent to a bend in the tab 136, to control the bending of the tab 136 during a collision. For instance, the notch 150 may define a point or region of weakened strength in the tab 136 at which the tab 136 bends when the tab 136 engages the engagement surface 142 during a collision.

Figure 10:
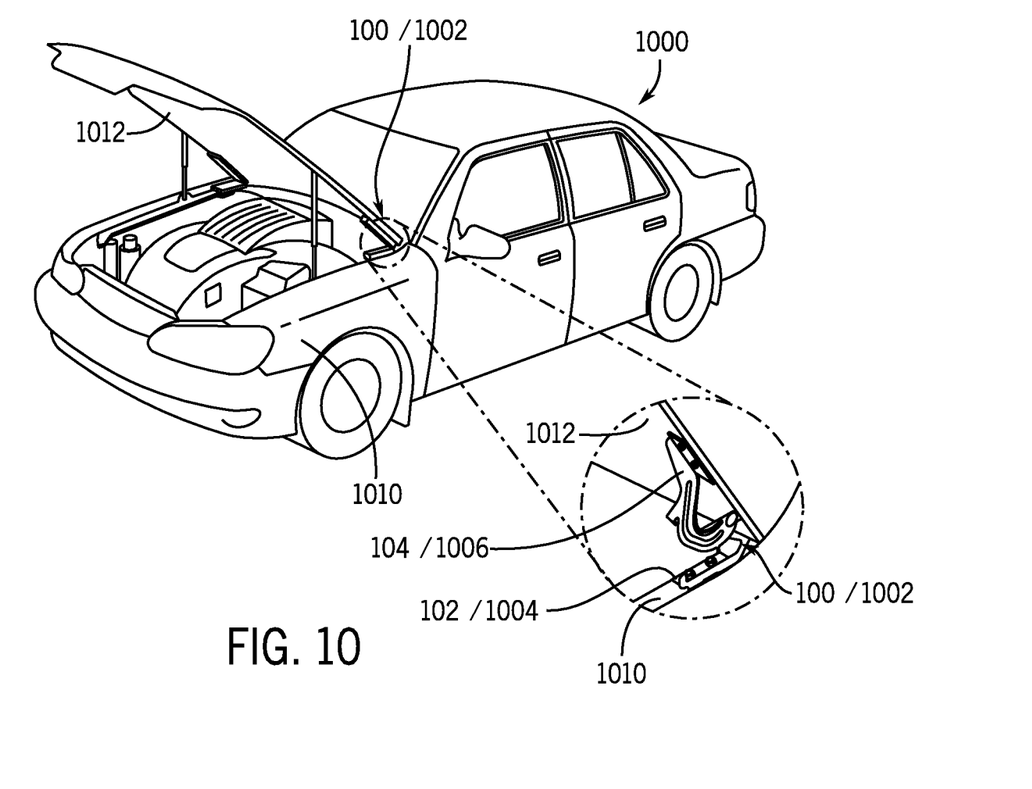
FIG. 10 is a fragmentary perspective of a vehicle implementing the apparatus of FIG. 1 as a vehicle hinge, according to one or more embodiments of the present disclosure.

FIG. 10 is a fragmentary perspective view of a vehicle 1000 implementing the apparatus 100 of FIGS. 1-5 as a vehicle hinge 1002, according to one or more embodiments of the present disclosure. The first portion 102 of the vehicle hinge 1002 may be a hinge bracket 1004. The second portion 104 of the vehicle hinge 1002 may be a hinge arm 1006. The hinge bracket 1004 may be secured to a first portion 102 of the vehicle 1000, such as to a vehicle body 1010. For example, the first flange 120 may be secured to the vehicle body 1010 via mechanical fasteners, welding, adhesive, corresponding retention features, or the like. The hinge arm 1006 may be secured to a second portion 104 of the vehicle 1000, such as to a vehicle hood 1012. For instance, the second flange 126 may be secured to the vehicle hood 1012 via mechanical fasteners, welding, adhesive, corresponding retention features, or the like. In such embodiments, the hinge arm 1006 may be coupled to the hinge bracket 1004 to allow movement of the vehicle hood 1012 relative to the vehicle body 1010, such as between open and closed positions of the vehicle hood 1012. The energy absorbing structure 134 may be configured relative to the hinge bracket 1004 and the hinge arm 1006 to absorb energy imparted to the vehicle hood 1012 during a collision, such as with a pedestrian or other object. For example, the energy absorbing structure 134 may include one or more elements, such as the tab 136 described above, positioned between the hinge bracket 1004 and the hinge arm 1006 to rotatably bend and absorb energy as the hinge arm 1006 moves towards the hinge bracket 1004 during a collision. Though FIG. 10 illustrates the apparatus 100 implemented as vehicle hinge 1002, such embodiments are illustrative only, and the apparatus 100 may be implemented in other suitable applications requiring energy absorption in a hinge-like device.

Figure 11:
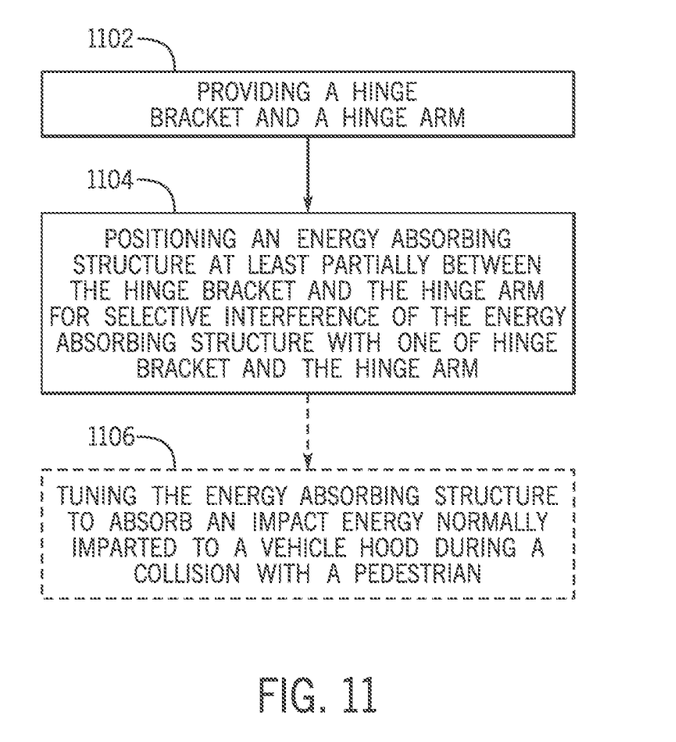
FIG. 11 is a flowchart of a method for absorbing energy in a hinge, according to one or more embodiments of the present disclosure.

FIG. 11 is a flowchart of a method 1100 for absorbing energy in a hinge, according to one or more embodiments of the present disclosure. Method 1100 is illustrated as a set of operations or steps and is described with continuing reference to FIGS. 1-10. One or more steps that are not expressly illustrated in FIG. 11 may be included before, after, in between, or as part of the illustrated steps. In one or more embodiments, the steps of method 1100 may be performed to absorb energy in a vehicle hinge, such as the vehicle hinge 1002 described above, imparted during a collision or impact, such as a vehicle hood with a pedestrian, though other configurations are contemplated.

In block 1102, the method 1100 includes providing a hinge bracket and a hinge arm. For instance, the first portion 102 and the second portion 104 of FIGS. 1-9, described above, and/or the hinge bracket 1004 and the hinge arm 1006 of FIG. 10, described above, may be provided. Depending on the application, block 1102 may include securing the hinge bracket to a vehicle body, such as the vehicle body 1010 of FIG. 10, described above. Block 1102 may include securing the hinge arm to a vehicle hood, such as the vehicle hood 1012 of FIG. 10, described above.

In block 1104, the method 1100 includes positioning an energy absorbing structure at least partially between the hinge bracket and the hinge arm for selective interference of the energy absorbing structure with one of the hinge bracket and the hinge arm. For example, as described above, the energy absorbing structure may include a tab, such as the tab 136 described above, configured to rotatably bend as the hinge arm moves towards the hinge bracket during a collision.

In block 1106, the method 1100 may include tuning the energy absorbing structure to absorb an impact energy normally imparted to the vehicle hood during a collision with a pedestrian. For instance, the tab 136 may be tuned to bend at predetermined forces normally imparted to a hinge during a vehicle hood-pedestrian collision. Specifically, the tab 136 may be sized, shaped, and/or otherwise configured to bend at a threshold impact force. Block 1106 may include configuring the bending of the tab 136 to absorb the impact energy before the hinge arm bottoms out against the vehicle body.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. An apparatus comprising:
   a first portion comprising a first body, a cutout defined in the first body, and a first flange formed monolithically with the first body for attachment to a first vehicle portion;
   a second portion comprising a second body and a second flange formed monolithically with the second body for attachment to a second vehicle portion, the second body rotatably coupled to the first body; and
   a tab extending from the second body and into the cutout of the first body, the tab bending due to engagement with a wall or surface defining the cutout to absorb energy imparted to the second portion during a collision, the tab bendable via rotation as the second portion moves towards the first portion during the collision, the tab comprising a notch to control bending of the tab during the collision, the notch defining a location of weakened strength in the tab at which the tab bends at a threshold force during the collision.

2. The apparatus of claim 1, wherein the tab extends from the second body for selective interference with the first body.

3. The apparatus of claim 2, wherein the tab is cantilevered from the second body for selective interference with the first body.

4. The apparatus of claim 3, wherein the tab is formed monolithically with the second body.

5. The apparatus of claim 2, wherein:
   the first portion comprises a hinge bracket securable to a vehicle body; and
   the second portion comprises a hinge arm securable to a vehicle hood.

6. The apparatus of claim 5, wherein:
   the hinge arm rotates about a rotational axis relative to the hinge bracket to move the vehicle hood between open and closed positions; and
   further rotation of the hinge arm about the rotational axis beyond the closed position of the vehicle hood bends the tab as the tab interferes with the first body.

7. The apparatus of claim 6, wherein selective interference of the tab with the wall or surface of the cutout defines the closed position of the vehicle hood.

8. A vehicle hinge comprising:
   a hinge bracket securable to a first portion of a vehicle, the hinge bracket comprising a first body, a cutout defined in the first body, and a first flange formed monolithically with the first body for attachment to the first portion of the vehicle;
   a hinge arm securable to a second portion of the vehicle, the hinge arm comprising a second body and a second flange formed monolithically with the second body for attachment to the second portion of the vehicle, the hinge arm rotatably coupled to the hinge bracket to allow movement of the second portion of the vehicle relative to the first portion; and
   a tab extending from the second body and into the cutout of the first body, the tab bending due to engagement with a wall or surface defining the cutout to absorb impact energy during a collision of an object with the second portion of the vehicle, the tab comprising a notch to control bending of the tab during the collision, the notch defining a location of weakened strength in the tab at which the tab bends at a threshold force during the collision.

9. The vehicle hinge of claim 8, wherein the tab is disposed in a space between the hinge bracket and the hinge arm.

10. The vehicle hinge of claim 9, wherein the space is defined within the hinge bracket.

11. The vehicle hinge of claim 8, wherein the tab is formed monolithically with the second body of the hinge arm.

12. The vehicle hinge of claim 8, wherein contact of the tab with the wall or surface of the cutout defines a nominal position of the hinge arm relative to the hinge bracket.

13. The vehicle hinge of claim 12, wherein further movement of the hinge arm towards the hinge bracket bends the tab to absorb energy imparted to the hinge arm.

14. The vehicle hinge of claim 8, wherein:
   the hinge bracket is securable to a vehicle body; and
   the hinge arm is securable to a vehicle hood.

15. The vehicle hinge of claim 8, wherein the hinge arm is rotatably coupled to the hinge bracket to rotate the second portion of the vehicle towards or away from the first portion of the vehicle.

16. A method for absorbing energy using the vehicle hinge of claim 8, the method comprising:
   providing the hinge bracket and the hinge arm; and
   positioning the tab at least partially between the hinge bracket and the hinge arm for selective interference of the tab with one of the hinge bracket and the hinge arm, the tab configured to rotatably bend via at least the notch as the hinge arm moves towards the hinge bracket during the collision.

17. The method of claim 16, wherein providing the hinge bracket and the hinge arm comprises:
   securing the hinge bracket to a vehicle body; and
   securing the hinge arm to a vehicle hood.

18. The method of claim 17, further comprising tuning the tab to absorb an impact energy normally imparted to the vehicle hood during a collision with a pedestrian.

19. The method of claim 18, wherein tuning the tab comprises configuring the bending of the tab to absorb the impact energy before the hinge arm bottoms out against the vehicle body.

20. The vehicle hinge of claim 8, wherein the second portion of the vehicle is movable relative to the first portion of the vehicle.

\* \* \* \* \*